(12) United States Patent
Foster et al.

(10) Patent No.: US 9,017,197 B2
(45) Date of Patent: Apr. 28, 2015

(54) HYDRAULIC DAMPING MECHANISM AND USE FOR BELT TENSIONING

(75) Inventors: Randy C. Foster, Strafford, MO (US); Randy Diefenderfer, Rogersville, MO (US); Jeffrey Allen Pendergrass, Everton, MO (US)

(73) Assignee: Dayco IP Holdings, LLC, Springfield, MO (US)

( * ) Notice: Subject to any disclaimer, the term of this patent is extended or adjusted under 35 U.S.C. 154(b) by 381 days.

(21) Appl. No.: 13/472,757

(22) Filed: May 16, 2012

(65) Prior Publication Data

US 2013/0310207 A1 Nov. 21, 2013

(51) Int. Cl.
*F16H 7/12* (2006.01)
*F16H 7/08* (2006.01)

(52) U.S. Cl.
CPC ............ *F16H 7/1227* (2013.01); *F16H 7/0834* (2013.01); *F16H 2007/081* (2013.01); *F16H 2007/0893* (2013.01)

(58) Field of Classification Search
CPC ........ F16H 2007/081; F16F 9/12; F16F 9/145
USPC .................................................. 474/135, 136
See application file for complete search history.

(56) References Cited

U.S. PATENT DOCUMENTS

| | | | |
|---|---|---|---|
| 2,514,137 A * | 7/1950 | O'Connor ..................... | 188/290 |
| 3,651,903 A * | 3/1972 | Butler et al. .................. | 188/290 |
| 4,601,683 A * | 7/1986 | Foster ........................... | 474/135 |
| 4,615,096 A | 10/1986 | Foster | |
| 4,838,839 A * | 6/1989 | Watanabe et al. ............. | 474/135 |
| 4,938,322 A * | 7/1990 | Sugasawara et al. ......... | 188/290 |
| 5,391,119 A * | 2/1995 | Kondo et al. ................. | 474/112 |
| 5,718,649 A * | 2/1998 | Hong et al. .................... | 474/91 |
| 8,162,787 B2 | 4/2012 | Gerring | |

OTHER PUBLICATIONS

International Search Report and Written Opinion, PCT/US2013/041050 (Sep. 12, 2013).

* cited by examiner

*Primary Examiner* — William E Dondero
*Assistant Examiner* — Mark K Buse
(74) *Attorney, Agent, or Firm* — Thompson Hine LLP

(57) ABSTRACT

A hydraulic damper for providing fluid damping to a tensioner in a drive system that includes a damper cup, which is mounted to the tensioner and configured to rotate about a central axle in tandem with the tensioner, an end plate having an outer face and an inner face, which is attached to the damper cup forming a fluid chamber, a peg attached to the end plate and extending away from the inner face and toward the damping cup, a damping fluid, which is contained within the fluid chamber, a plurality of shear plates housed within the fluid chamber comprising alternating fixed plates engaged with a fixed component of the tensioner and rotatable plates engaged with a rotatable component of the tensioner where the peg extends through openings in each of the shear plates allowing for rotation of the rotatable plate with the rotation of the peg.

23 Claims, 4 Drawing Sheets

HYDRAULIC DAMPING MECHANISM AND USE FOR BELT TENSIONING

TECHNICAL FIELD

The present invention relates generally to a damping mechanism for tensioners for a drive belt system and more particularly to a hydraulic damped tensioner utilizing a damping mechanism utilizing shear forces generated from rotating plates through a viscous fluid.

BACKGROUND

Belt tensioners use a system or mechanism to dampen tensioner movement which minimizes steady state vibrations or transient events that cause belt slip. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occurs as a result of manufacturing variation, operating temperature and component break-in or wear can also result in undesirable tensioner responsiveness.

Damping derived by utilizing shear forces generated by rotating plates through a viscous fluid has been used with belt tensioners. One particular method involves a rotating plate and a fixed plate surrounded by a viscous fluid as in U.S. Pat. No. 4,838,839 to Watanabe. To achieve the fluid damping in Watanabe, the fixed plates are fixed directly to the fixed shaft, and the displaceable plates are fixed directly to an oscillation sleeve.

Other solutions using plates for hydraulic damping are found in U.S. Pat. Nos. 4,601,683 and 5,391,119 to Foster and Kondo respectively. These designs specifically manufacture the plates to attach directly to the rotating and fixed parts of the tensioner. This approach requires more complex manufacturing and assembly processes.

The aforementioned hydraulic damping mechanisms are not ideal. Accordingly, a new damping mechanism and tensioner design is desired.

SUMMARY

One aspect disclosed herein is a hydraulic damper for providing fluid damping to a tensioner in a drive system that includes a damper cup, which is mounted to the tensioner and configured to rotate about a central axle in tandem with the tensioner, an end plate having an outer face and an inner face, which is attached to the damper cup forming a fluid chamber, a pin attached to the end plate and extending away from the inner face and toward the damping cup, a damping fluid, which is contained within the fluid chamber, a rotatable plate having an opening configured to accept the pin through the rotatable plate and rotate about the central axle, and a fixed plate having an opening configured to accept the pin through the fixed plate, which is fixed to and does not rotate about the central axle. During wind-up and tensioning of the tensioner, a shear force is applied to the rotatable plate moving through the damping fluid to provide damping to the tensioner.

In another embodiment, the hydraulic damper includes a damper cup, which is mounted to the tensioner and configured to rotate about a central axle in tandem with the tensioner, an end plate having an outer face and an inner face, which has a central opening and is configured to accept the central axle and rotate about the central axle, and wherein the end plate is attached to the damper cup forming a fluid chamber, a ring configured to be mounted on the central axle and fit within the central opening of the end plate forming a fluid tight seal between the end plate and the central axle, a pin attached to the end plate and extending away from the inner face and toward the damping cup, a damping fluid, which is contained within the fluid chamber, a rotatable plate, which is mounted on a hub configured to be mounted on and rotate about the central axle, and the rotatable plate has an opening configured to accept the pin through the rotatable plate, and a fixed plate having an opening configured to accept the pin through the fixed plate, wherein the fixed plate is fixed to and does not rotate about the central axle.

The features, functions, and advantages discussed can be achieved independently in various embodiments of the present invention or may be combined in yet other embodiments further details of which can be seen with reference to the following description and drawings.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

The hydraulic damper disclosed herein provides a tensioner with hydraulic damping. The tensioner is typically part of a power system, known as a Front End Accessory Drive ("FEAD") system where the tensioner provides tension to an endless power transmitting element such as a belt, chain, or other continuous loop in a system driven by at least one source and that also drives at least one accessory. The endless power transmitting element and the tensioner operate in concert with the tensioner providing tension to the power transmitting element as needed and responding to dynamic conditions thereof.

Engines that utilize an endless power transmitting element for driving a plurality of driven accessories is well known in the art. Additionally belt tensioners utilized to provide a tensioning force on the endless power transmitting element are also well known in the art.

Figure 1:
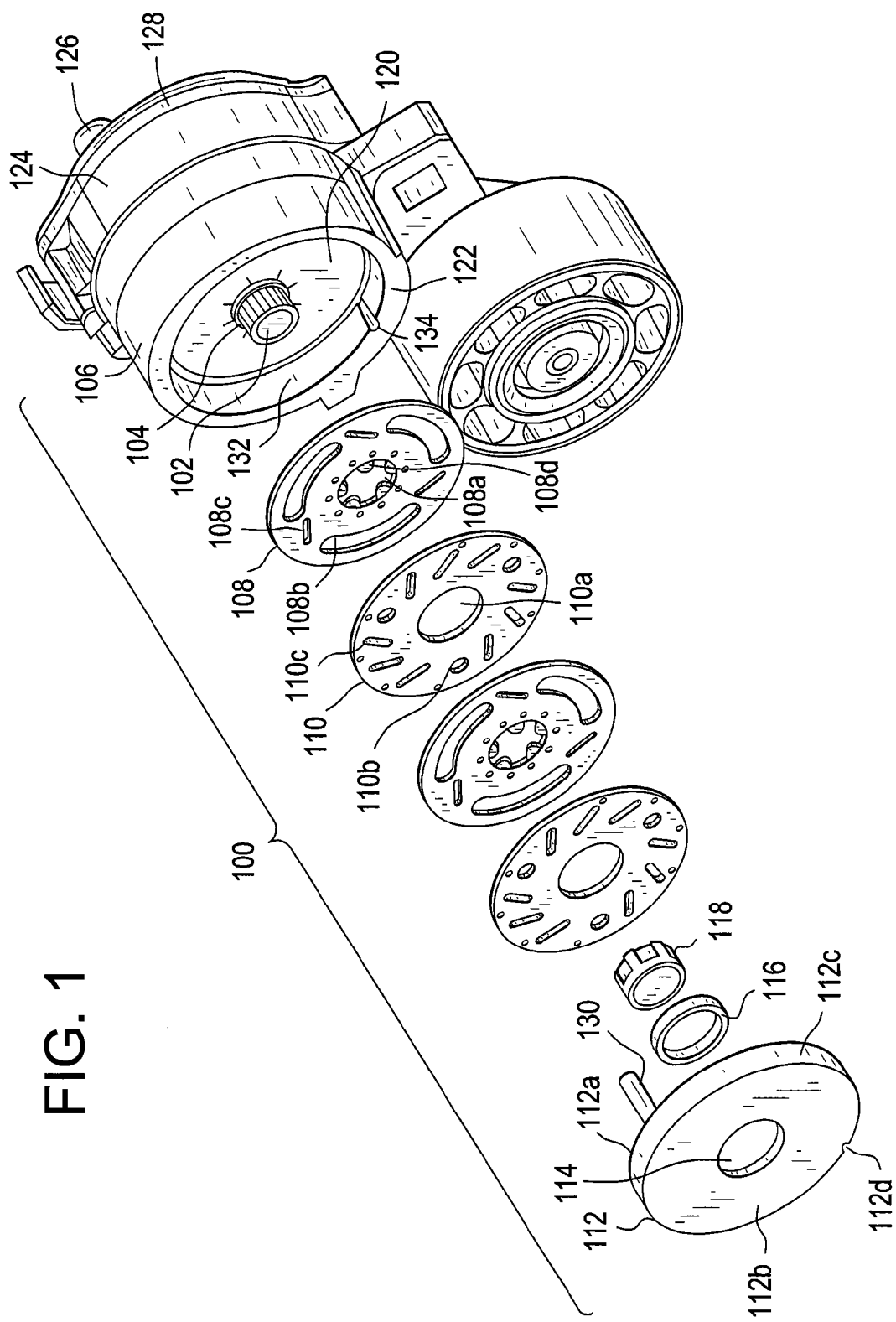
FIG. 1 is an exploded perspective view of an embodiment of the hydraulic damper.
Figure 2:
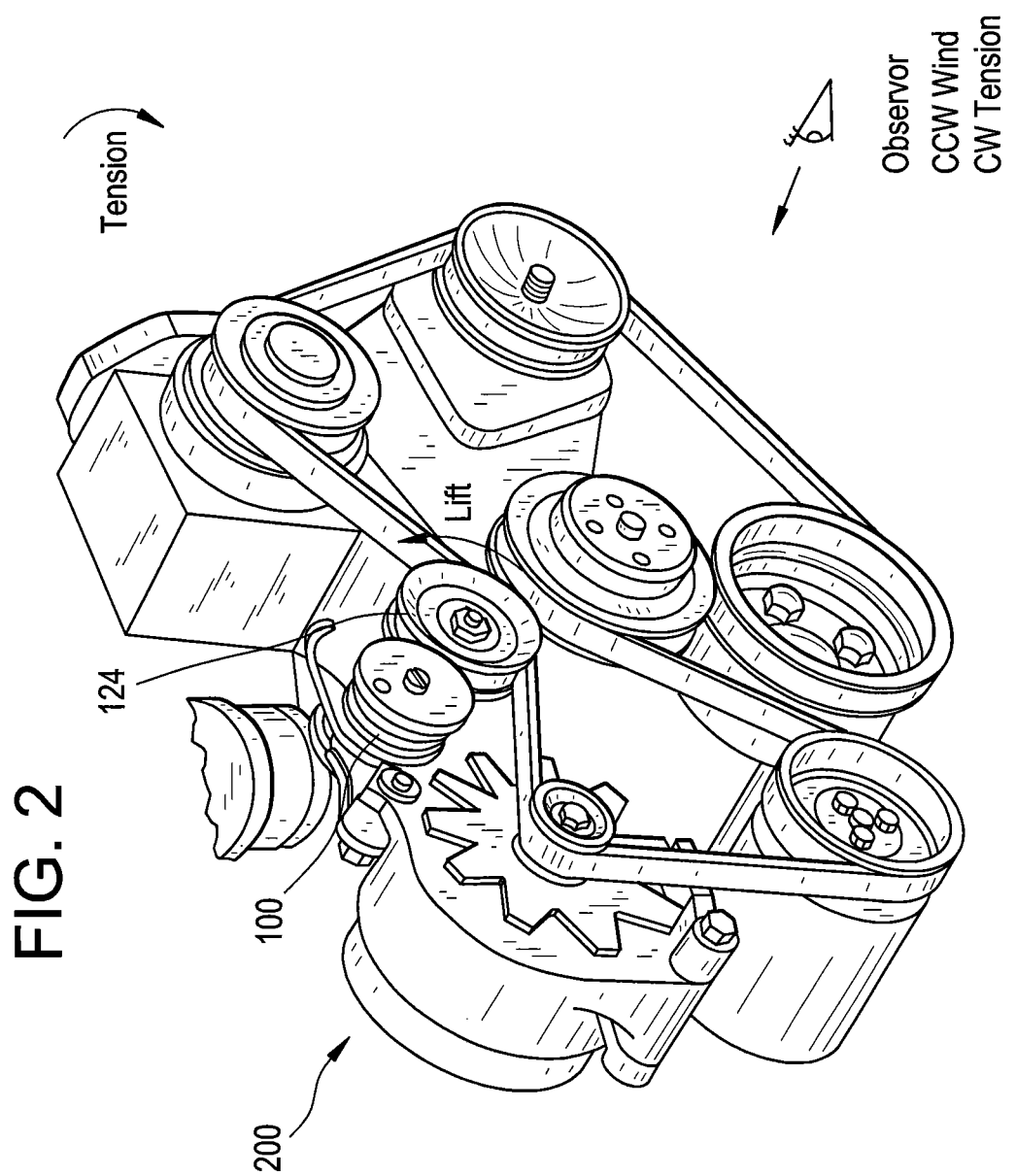
FIG. 2 is a is a front view of an engine which utilizes an embodiment of a tensioner using the new hydraulic damper.

Referring now to FIGS. 1 and 2, in an embodiment, the hydraulic damper 100 of this invention is utilized to provide damping to a tensioner 124 utilized in continuous belt or chain drive systems in the manner described below. The tensioner 124 is configured to be fixed to an engine 200 using a mounting bracket 128. The mounting bracket 128 is configured with a mounting peg 126 which is configured to be disposed within a designated opening in the engine 200. The mounting peg 126 allows the mounting bracket 128 to be correctly aligned and oriented during operation of the engine 200. The mounting bracket is secured to the engine with a bolt (not shown) passing through a pivot member 102. The combination of the mounting bracket 128 and the pivot member 102 serve as the support structure for the tensioner 124. Additionally, the pivot member 102 is configured to serve as a central axle about which the tensioner 124 rotates. Other methods may be used to secure the mounting bracket 128 to the engine, such as bolts, screws, welds, or any other suitable fastener known in the art that will hold the mounting bracket 128 in place during operation of the engine. Additionally, the mounting bracket 128 may be of any configuration and include any number of openings for receiving the fasteners to mount to the engine.

In an embodiment, the pivot member 102 extends axially away from the engine 200, through and beyond the tensioner 124 providing support for the hydraulic damper 100. The pivot member 102 is stationary and fixed to the engine 200 and the tensioner 124 rotates about the pivot member 102. A damper cup 106, having a closed end 120 and an open end 122 is mounted on the pivot member 102 through a central opening in the closed end 120 so that the closed end 122 abuts the tensioner 124. The open end 122 has an inner wall 132 with a notch 134. Once mounted on the pivot member 102, the damper cup 106 is configured to rotate, in tandem with the tensioner 124, about the pivot member 102. An end cap 104 is secured to the pivot member 102 and configured to prevent the damper cup 106/tensioner 124 combination from sliding off the end of the pivot member 102.

Fixed plates 108 having a diameter less than the inner diameter of the open end 122 is mounted on a hub 118 though central opening 108a. The fixed plate is secured to the hub 118 using lobes 108d and any means known in the art such that the fixed plates 108 remain stationary with respect to and does not rotate with the damper cup 106 and the tensioner 124. The fixed plates 108 contain one or more curved openings 108b located between the central opening 108a and the outer edge of the plates 108. Additionally, the fixed plates 108 contain one or more openings 108c located between the central opening 108a and the outer edge of the fixed plates 108. The openings 108c allow a damping fluid 136 (FIG. 3) to completely surround and immerse the fixed plates 108. In another embodiment, the fixed plates 108 do not contain openings 108c, and have a diameter less than the inner diameter of the open end 122 such that a gap exists between the diameter of the fixed plates 108 and the inner wall 132 to allow the damping fluid 136 to completely surround and immerse the fixed plates 108. Openings 108b are elongated and at least one receives connecting peg 130 of end plate 112 and allows for the rotation of end plate 112 relative to the fixed plates 108.

The hub 118 is mounted on pivot member 102 and configured to be fixed with pivot member 102. Rotatable plates 110 having a diameter less than the inner diameter of the open end 122 are mounted on the hub 118 though central opening 110a. The rotatable plates 110 are configured to rotate about the pivot member 102. The rotatable plates 110 contain one or more circular openings 110b located between the central opening 110a and the outer edge of the rotatable plates 110. Additionally, the rotatable plates 110 contain one or more openings 110c located between the central opening 110a and the outer edge of the rotatable plates 110. The openings 110c allow the damping fluid 136 (FIG. 3) to completely surround and immerse the rotatable plates 110. In another embodiment, the rotatable plates 110 do not contain openings 110c, and have a diameter less than the inner diameter of the open end 122 such that a gap exists between the diameter of the rotatable plates 110 and the inner wall 132 to allow the damping fluid 136 to completely surround and immerse the rotatable plates 110. The rotatable plates 110 are driven by a connecting peg 130

An end plate 112 having an inner face 112a, an outer face 112b, an outer edge 112c, and a notch 112d located on the outer edge 112c. The connecting peg 130 is fixed to the inner face 112a and extends out away from the inner face 112a towards the tensioner 124. The end plate 112 is disposed within the open end 122. When placing the end plate 112 into the open end 122, the assembler aligns notch 112d with notch 134 forming a small opening 138. The end plate 112 is fixed to the inner wall 132 forming a fluid tight seal between the end plate 112 and the inner wall 132 except for the small opening 138. In another aspect, the end plate 112 may be properly aligned with open 122 using a key located on end plate 112 that fits within a keyway located on the inner wall 132. Additionally, any other method for aligning objects which is known in the art may also be used to properly align notch 112d with notch 134. Once the end plate 112 is fixed to the inner wall 132, a fluid chamber 140 is created between the closed end 120, the inner face 112a, and the inner wall 132. Additionally, the end plate 112, which is fixed to the inner wall 132 is configured to rotate in tandem with the damper cup 106 and the tensioner 124. The end plate 112, the rotatable plate 110, and the fixed plate 108 are aligned such that connecting peg 130 passes through the circular opening 110b and the curved slot opening 108b. In another embodiment, end plate 112 has a central opening 114. A ring 116 having an inner diameter equal to the outer diameter of the hub 118 is mounted on the hub 118 forming a fluid tight seal between the ring 116 and the hub 118. The ring 116 has an outer diameter equal to the diameter of the central opening 114. The end plate 112 is mounted to the ring 116 via the central opening 114 such that a fluid tight seal is formed between the end plate 112 and the ring 116.

In an embodiment, the fluid chamber 140 is filled with the damping fluid 136 through the small opening 138. After filling the fluid chamber 140 with the damping fluid 136, the small opening 138 is sealed using a plug, ball bearing, or any other method known in the art that would create a fluid tight seal.

Figure 3:
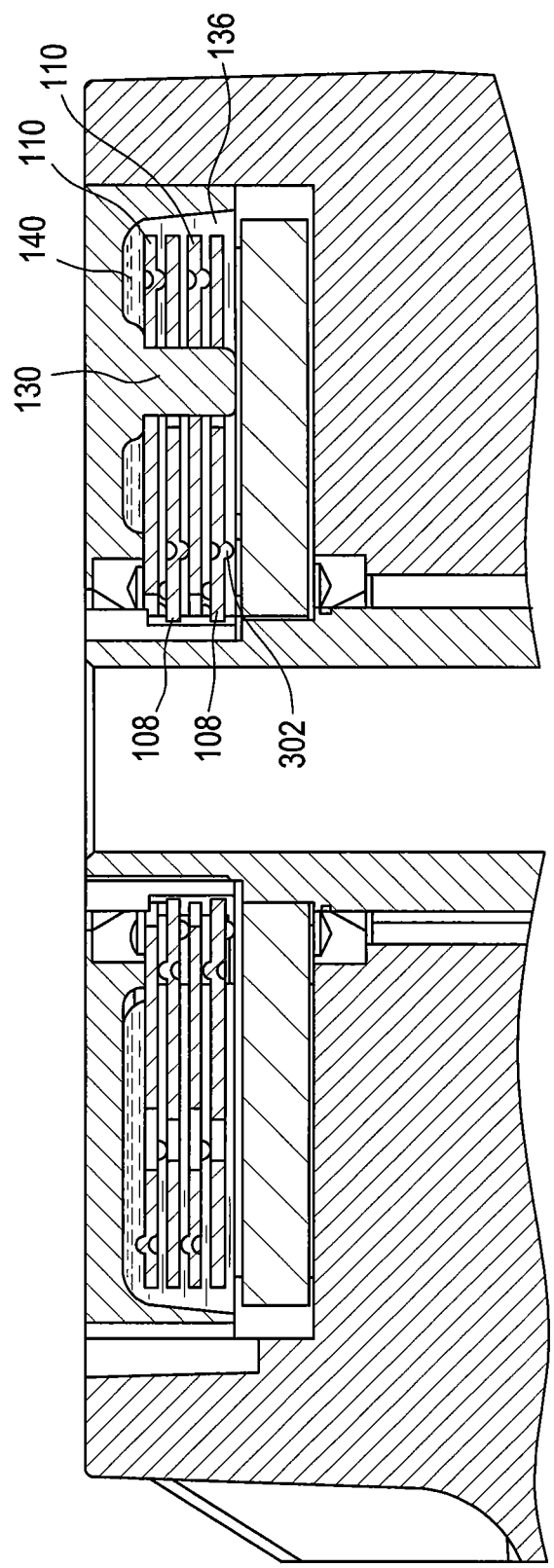
FIG. 3 is a cross sectional view of an embodiment of the hydraulic damper.

Referring to FIG. 3, in an embodiment, protrusions 302 protrude from the surface of the fixed plates 108. The protrusions 302 are configured to provide a space between the fixed plates 108 and the closed end 120 of the damper cup 106. Additionally, protrusions 302 are configured to provide a space between the fixed plates 108 and the rotatable plates 110. Protrusions 304 protrude from the surface of the rotatable plates 110 and are configured to provide a space between the rotatable plates 110 and adjacent fixed plates 108. In an embodiment, a plurality of fixed plates 108 and rotatable plates 110 are mounted about hub 118 in an alternating manner.

In an embodiment, tensioning a slack power transmitting element is an unwinding of a wound-up tensioner which will be referred to herein as the tensioning direction T. In the opposite direction, referred to herein as the winding direction W, a winding up of the tensioner occurs in response to a prevailing force of the power transmitting element which is tightening in the span where the tensioner resides. The winding of the tensioner may have some potentially deleterious effects, so to mitigate these effects it is desirable to have a damper, for example a hydraulic damper, incorporated in the tensioner to resist the movement of the power transmitting element without adversely affecting movement of the tensioner, in particular its arm to tension the power transmitting element. This kind of damping is generally known as hydraulic damping.

Figure 4:
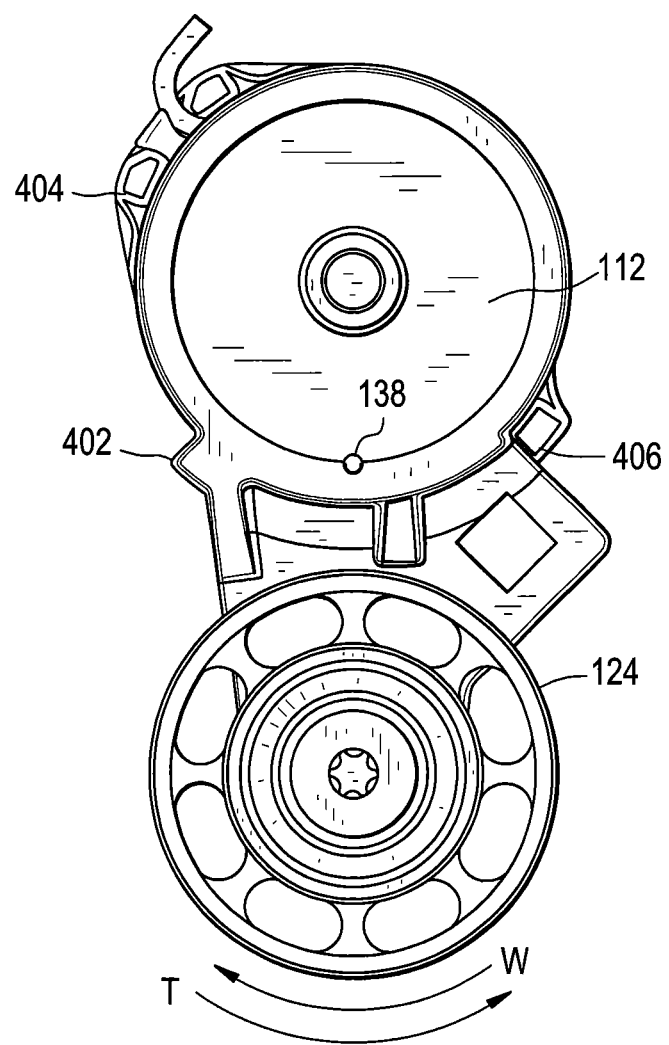
FIG. 4 is a front view of an embodiment of the hydraulic damper and tensioner assembly.

Referring to FIGS. 3 and 4, in an embodiment, the hydraulic damper 100 achieves damping when the end plate 112 rotates in tandem with the damper cup 106 and tensioner 124 in either the tensioning direction T or winding direction W. There are limit stops 402, 404, and 406, which limit the travel of the tensioner 124. When in a resting position, the tensioner 124 rests against limit stop 406. As the tensioner 124 rotates in the winding direction W, the tensioner travels in that direction until either the belt force acting on the tensioner stops, or limit stop 402 meets limit stop 404. When limit stops 402 and 404 come together, the tensioner 124 is prevented from moving further in the winding direction W. After winding, the tensioner 124 is biased to rotate in the tensioning direction T. When rotating in the tensioning direction T, the tensioner 124 continues to rotate in the tensioning direction until either the tensioner 124 is prevented from further rotation by the belt force or limit stop 406. When the tensioner 124 reaches limit stop 406, the tensioner 124 is prevented from rotating any further in the tensioning direction T.

As the rotatable plate 110 rotates through the surrounding damping fluid 136 a shear force is created between the rotatable plate 110 and the fixed plate 108. This shear force acts in the opposite direction to the rotation of the rotatable plate 110. This resistance by the shear force acts to dampen the movement of the tensioner 124 in either the tensioning direction T or winding direction W depending on the direction of rotation of the tensioner 124. The shear force is generated each time the rotatable plate 110 rotates through the damping fluid 136 regardless of whether the rotation is in the tensioning direction T or winding direction W. Therefore, the hydraulic damper 100 provides damping to the tensioner 124 in both the tensioning direction T and the winding direction W.

In an embodiment, the hydraulic damper 100 may be assembled as a stand-alone unit, including all components and damping fluid 136. The hydraulic damper 100 can then be inserted into the main body of tensioner 124.

The components of the hydraulic damper 100 can be fabricated using a variety of techniques including forging, casting, die-casting, injection molding, sintering, or machining or fabricated in different components, or other techniques known to one of ordinary skill in the art and then joined together using a variety of methods such as sintering, welding, bonding, bolting, and even interference fits or other methods known to one of ordinary skill in the art.

The embodiments of this invention shown in the drawing and described above are exemplary of numerous embodiments that may be made within the scope of the appended claims. It is understood that numerous other configurations of the hydraulic damper 100 may be created taking advantage of the disclosed approach. In short, it is the applicant's intention that the scope of the patent issuing herefrom will be limited only by the scope of the appended claims.

What is claimed is:

1. A hydraulic damper for providing fluid damping to a tensioner in a drive system comprising:
a damper cup having an open end and a closed end, wherein the damper cup is operatively associated with a tensioner arm and configured to rotate about a central axle in tandem with the tensioner arm;
an end plate sealingly engaged with the open end of the damper cup to form a fluid chamber;
a connecting member attached to the end plate and extending toward the closed end of the damping cup;
a damping fluid within the fluid chamber;
a plurality of shear plates housed within the fluid chamber, the plurality of shear plates comprising alternating fixed plates engaged with a fixed component of the tensioner and rotatable plates engaged by the connecting member for rotation with a rotatable component of the tensioner;
wherein at least one of the fixed plates has an elongate opening that defines a range of rotation of the connecting member relative to the fixed plate of less than 360 degrees in both a winding direction and a tensioning direction, the connecting member being seated in the elongate opening;
wherein the rotatable plates each have at least one opening having received the connecting member therein.

2. The hydraulic damper of claim 1, wherein said end plate and each of said plurality of shear plates have a central opening having received therein said central axle, wherein said end plate rotates about said central axle.

3. The hydraulic damper of claim 2 further comprising a ring configured to be mounted on said central axle and disposed within said end plate's central opening forming a fluid tight seal between said end plate and said central axle.

4. The hydraulic damper of claim 1, wherein said rotatable plates are mounted on a hub, wherein said hub is configured to be mounted on and rotate about said central axle.

5. The hydraulic damper of claim 1, wherein said rotatable plates have protrusions configured to maintain a fixed distance of separation between said rotatable plates and said fixed plates.

6. The hydraulic damper of claim 1, wherein said fixed plates have protrusions configured to maintain a fixed distance of separation between said rotatable plates and said fixed plates.

7. The hydraulic damper of claim 1, wherein said damping fluid is a silicone based oil.

8. The hydraulic damper of claim 1, wherein said damping fluid is a petroleum based oil.

9. The hydraulic damper of claim 1, wherein said connecting member and said end plate are formed as a singular part.

10. The hydraulic damper of claim 1, wherein said rotatable plates and said fixed plates each contain port openings to allow said damping fluid to pass through said rotatable plates and said fixed plates.

11. The hydraulic damper of claim 1, wherein said opening in said fixed plates defines a range of rotation for said connecting member in both the winding direction and the tensioning direction that is less than 120 degrees.

12. A hydraulic damper for providing fluid damping to a tensioner in a drive system comprising:
a damper cup having an open end and a closed end, wherein the damper cup is operatively associated with a tensioner arm and configured to rotate about a central axle in tandem with the tensioner arm;
an end plate having a central opening, sealingly engaged with the open end of the damper cup to form a fluid chamber;
a damping fluid within the fluid chamber;
a plurality of shear plates housed within the fluid chamber, the plurality of shear plates comprising alternating fixed plates engaged with a fixed component of the tensioner and rotatable plates engaged with a rotatable component of the tensioner; and
a connecting member extending from said end plate toward said closed end of said damper cup;
wherein the fixed plates each have at least one opening positioned between a central opening therein and an outer edge thereof;

wherein the rotatable plates each have at least one opening positioned between a central opening therein and an outer edge thereon;

wherein the opening in each of the fixed plates unalignedly, overlaps the opening in an adjacent rotatable plate;

wherein at least one of said fixed plates includes an elongate opening that defines a range of rotation for said connecting member in both a winding direction and a tensioning direction that is less than 360 degrees, the connecting member being received in said elongate opening.

13. The hydraulic damper of claim 12, wherein said rotatable plates has protrusions configured to maintain a fixed distance of separation between said rotatable plates and said fixed plates.

14. The hydraulic damper of claim 12, wherein said fixed plates have protrusions configured to maintain a fixed distance of separation between said rotatable plates and said plates.

15. The hydraulic damper of claim 12, wherein said damping fluid is a silicone based oil.

16. The hydraulic damper of claim 12, wherein said damping fluid is a petroleum based oil.

17. A method of hydraulically damping a tensioner in a drive system comprising:

providing a tensioner having a damper cup having an open end and a closed end, wherein the damper cup is operatively associated with a tensioner arm and configured to rotate about a central axle in tandem with the tensioner arm;

providing an end plate having a connecting member extending therefrom;

mounting a plurality of shear plates on the central axle within said damper cup, the plurality of shear plates comprising alternating fixed plates engaged with a fixed component of the tensioner and rotatable plates engaged with a rotatable component of the tensioner, wherein at least one of the fixed plates has an elongate opening that defines a range of rotation of the connecting member relative to the fixed plate of less than 360 degrees in both a winding direction and a tensioning direction;

sealing and closing the damper cup's open end with the end plate, wherein the connecting member passes through the rotatable plates and is received in the elongate opening of the at least one fixed plate; and filling the fluid chamber with a damping fluid.

18. The method of claim 17, wherein said rotatable plates have protrusions configured to maintain a fixed distance of separation between said rotatable plates and said fixed plates.

19. The method of claim 17, wherein said fixed plates have protrusions configured to maintain a fixed distance of separation between said rotatable plates and said fixed plates.

20. The method of claim 17, wherein said damping fluid is a silicone based oil.

21. The method of claim 17, wherein said damping fluid is a petroleum based oil.

22. The method of claim 17, wherein said connecting member and said end plate are formed as a singular part.

23. The method of claim 17, wherein said rotatable plates and said fixed plates each further comprise port openings to allow said damping fluid to pass through said rotatable plates and said fixed plates.

\* \* \* \* \*